United States Patent [19]

Yamada et al.

[11] Patent Number: 4,552,684

[45] Date of Patent: Nov. 12, 1985

[54] DICHROIC DYE AND LIQUID CRYSTALLINE COMPOSITION FOR COLOR DISPLAY

[75] Inventors: Yasuyuki Yamada; Tsutomu Nishizawa, both of Yokohama; Tamio Mikoda; Tooru Miyahara, both of Ohmuta; Masaharu Kikutsugi, Mihashi, all of Japan

[73] Assignee: Mitsui Toatsu Chemicals, Inc., Tokyo, Japan

[21] Appl. No.: 586,981

[22] Filed: Mar. 7, 1984

[30] Foreign Application Priority Data

Mar. 8, 1983 [JP] Japan ................................. 58-36613

[51] Int. Cl.[4] ........................ G02F 1/13; C09K 3/34; C09B 5/24
[52] U.S. Cl. .................................. 252/299.1; 350/349; 548/149; 548/223
[58] Field of Search .................... 350/349; 252/299.1; 548/149, 223

[56] References Cited

U.S. PATENT DOCUMENTS

| 4,299,720 | 11/1981 | Osman et al. | 252/299.1 |
| 4,356,102 | 10/1982 | Aftergut et al. | 252/299.1 |

FOREIGN PATENT DOCUMENTS

| 38460 | 10/1981 | European Pat. Off. | 252/299.1 |
| 76633 | 4/1983 | European Pat. Off. | 252/299.1 |
| 48-77176 | 10/1973 | Japan | 252/299.1 |
| 50-121580 | 9/1975 | Japan | 252/299.1 |
| 55-123673 | 9/1980 | Japan | 252/299.1 |
| 59-56475 | 3/1984 | Japan | 252/299.1 |

OTHER PUBLICATIONS

Aftergut, S., et al., Mol. Cryst. Liq. Cryst., vol. 78, No. 1–4, pp. 271–277 (1981).

Primary Examiner—Teddy S. Gron
Attorney, Agent, or Firm—Fisher, Christen & Sabol

[57] ABSTRACT

An anthraquinonic dye of the formula

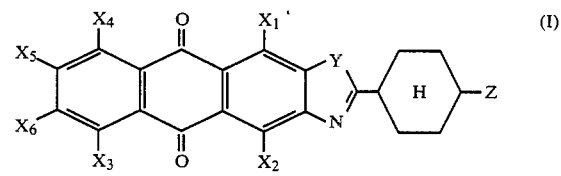

is provided. When used as dichloric dyes in liquid crystalline color display elements, these dyes (1) have sufficient coloring ability in small amounts, (2) have a high dichloric ratio, (3) are fully soluble in liquid crystals, and (4) have excellent durability, are stable and do not degrade the performance of a display device upon long-term use.

2 Claims, No Drawings

DICHROIC DYE AND LIQUID CRYSTALLINE COMPOSITION FOR COLOR DISPLAY

This invention relates to novel dichroic dyes and a liquid crystalline composition for color display comprising such a dichroic dye.

More specifically, this invention relates to novel anthraquinonic compounds having dichroic property represented by the formula

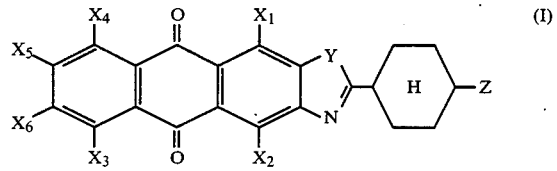

wherein
each of $X_1$, $X_2$, $X_3$ and $X_4$ represents a hydrogen atom, a halogen atom, an amino group or a hydroxyl group, in which the amino or hydroxyl group may be substituted by an alkyl group having 1 to 4 carbon atoms;
each of $X_5$ and $X_6$ represents a hydrogen atom, a halogen atom, an amino group, a hydroxyl group or an alkyl group having 1 to 15 carbon atoms, in which at least one methylene moiety in the alkyl group may be replaced by an oxygen atom, a carboxyl group, an oxycarbonyl group and/or a phenylene group, and the amino group or the hydroxyl group may be substituted by an alkyl group having 1 to 4 carbon atoms;
Y represents an oxygen or sulfur atom; and
Z represents an alkyl group having 3 to 15 carbon atoms, in which at least one methylene moiety in the alkyl group may be replaced by an oxygen atom, a carboxyl group, an oxycarbonyl group and/or a phenylene group.

The invention also relates to a liquid crystalline composition for use in display devices utilizing the electro-optical effects of liquid crystals, said composition comprising liquid crystals and dissolved therein at least one anthraquinonic dichroic dye represented by formula (I) above.

In recent years, liquid crystal display elements have gained widespread acceptance in the field of display elements to save energy and reduce the size of display devices. Most of the liquid crystal display elements now in use utilize the electro-optical effect of twisted nematic liquid crystals. They are required to be used in combination with two polarized films, and many restrictions are imposed on their use. As an alternative crystal display method, liquid crystal display by the guest-host mode which utilizes the electro-optical effect of a colored liquid crystal composition obtained by dissolving a dichroic dye in nematic liquid crystals has been studied, and to some extent come into practical use in watches, household electrical appliances, and industrial measuring instruments.

The guest-host mode liquid crystal display method operates on the principle that dichroic dye molecules as a guest are oriented according to the alignment of liquid crystal molecules as a host. Application of an external stimulus which is usually an electric field changes the aligning direction of liquid crystal molecules from the "off" state to the "on" state, and at the same time, the aligning direction of the dichroic dye molecules also changes. Consequently, the degree of light absorption by the dye molecules differs between the two states, and display is thus effected. The dichroic dye used in this method should at least meet the following requirements. (1) It has sufficient coloring ability in small amounts. (2) It has a high dichroic ratio, and shows a high contrast between the application of a voltage and the absence of a voltage. (3) It has sufficient solubility in liquid crystals. (4) It has excellent durability, is stable, and does not degrade the performance of a display device even when it is used for a long period of time. Various dichroic dyes meeting the above requirements have already been proposed and to some extent gained acceptance in digital clocks, meters, etc. But they have one or more defects which are desired to be remedied. For example, those having a high dichroic ratio have poor durability, and those having excellent durability do not have a dichroic ratio which permits clear display in practical applications. In particular, with regard to dichroic dyes having a reddish color, some azoic dyes of a reddish color are known to have a relatively high dichroic ratio, but they have too low durability to be practical. The anthraquinonic dyes generally having good durability have been proposed, but none of them can be said to have a dichroic ratio on a practically feasible level. This situation markedly restricts the usage of guest-host mode crystal display elements. Accordingly, it has been strongly desired in the art to develop dyes having excellent durability and a high dichroic ratio, particularly those of a reddish color tone.

The present inventors, in an attempt to meet this requirement, have alrady proposed many dichroic dyes, but these dyes have not proved to be entirely satisfactory. Particularly, the compound of the following formula

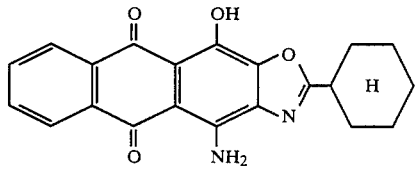

which the present inventors proposed in Japanese Laid-Open Patent Publication No. 123673/1980 is similar in structure to the compounds of general formula (I) in accordance with this invention cannot fully meet the demand of the market in regard to its solubility in liquid crystals, and its improvement has been desired.

It is an object of this invention therefore to provide a novel dichroic dye which can completely meet the aforesaid requirement.

According to this invention, novel anthraquinonic compounds of general formula (I) are provided as dichroic dyes meeting the above object. Most of the compounds of formula (I) have a characteristically higher dichroic ratio than the anthraquinonic dichroic dyes proposed heretofore. They also have excellent durability, are stable, and have good solubility in various liquid crystals. Thus, the compounds of formula (I) fully meet the requirements of dichroic dyes to be applied to liquid crystal color display devices.

The dichroic dyes of formula (I) in accordance with this invention can be synthesized by subjecting a compound of the formula

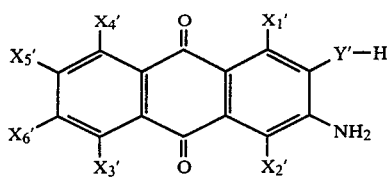

(Ia)

wherein $X'_1$, $X'_2$, $X'_3$, $X'_4$, $X'_5$, $X'_6$ and $Y'$ are the same atoms or groups as $X_1$, $X_2$, $X_3$, $X_4$, $X_5$, $X_6$ and $Y$ in formula (I), or precursor groups capable of being converted to the same groups, and a compound represented by the formula

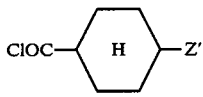

(Ib)

wherein $Z'$ represents the same atom or group as $Z$ in formula (I), or a precursor group capable of being converted to the same group, to dehydrochlorinating condensation and dehydrocyclization in a high-boiling inert organic solvent such as o-dichlorobenzene and nitrobenzene, and optionally subjecting the product to a required additional reaction.

Specific examples of the compound of formula (Ia) include
3-amino-1,2-dihydroxyanthraquinone,
3-amino-1,2,4-trihydroxyanthraquinone,
3-amino-1,2,5,8-tetrahydroxyanthraquinone,
2-amino-3-hydroxy-5,8-dibromoanthraquinone,
2-amino-3-hydroxy-5,8-di(methylamino)-anthraquinone,
2-amino-3-hydroxy-5,8-dibromo-7- methylanthraquinone,
3-amino-1,2,5,7,8-pentahydroxyanthraquinone,
3-amino-1,2-dihydroxy-anthraquinone-7- carboxylic acid,
2-amino-3-hydroxy-4,8-dibromo-7-methoxycarbonylanthraquinone,
3-amino-1,2,4-trihydroxy-7-(4'-butylphenyl)- anthraquinone,
3-amino-1-hydroxy-2-mercaptoanthraquinone,
2-amino-3-mercapto-5,8-dibromoanthraquinone,
3-amino-1,2-dihydroxy-6-isopropylanthraquinone,
3-amino-1,2,5-trihydroxy-6-butylanthraquinone,
3-amino-1,2-dihydroxy-4-bromoanthraquinone,
3-amino-2-hydroxy-1,4-dibromoanthraquinone, and
3-amino-2-hydroxy-1-methylaminoanthraquinone.

Specific examples of the group $Z'$ in formula (Ib) include alkyl groups such as propyl, isopropyl, butyl, isobutyl, s-butyl, t-butyl, pentyl, hexyl, heptyl, octyl, nonyl, dodecyl and pentadecyl; a hydroxyl group; alkoxy groups such as ethoxy, pentoxy, octoxy and dodecyloxy; a carboxyl group; alkoxycarbonyl groups such as methoxycarbonyl and ethoxycarbonyl; hydroxyalkyl groups such as hydroxymethyl and hydroxyethyl; alkoxyalkyl groups such as methoxyethyl and methoxypropyl; aralkyl groups such as 4'-methylphenethyl; and alkyl-, alkoxy- or acyloxy-substituted phenyl groups such as 4'-ethylphenyl, 4'-butylphenyl, 4'-octylphenyl, 4'-methoxyphenyl, 4'-octoxyphenyl, 4'-nonaxyphenyl, and 4'-acetoxyphenyl.

When a compound of the formula

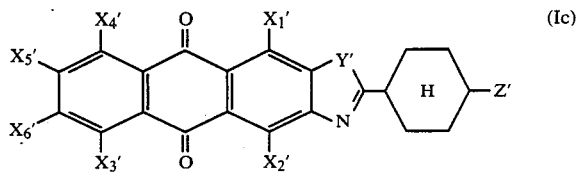

(Ic)

wherein $X'_1$, $X'_2$, $X'_3$, $X'_4$, $X'_5$, $X'_6$, $Y'$, and $Z'$ are the same as defined with regard to formulae (Ia) and (Ib), is not a compound corresponding to formula (I), it may be converted to a compound corresponding to formula (I) by subjecting it to a required additional reaction. Such an additional reaction may, for example, be the introduction of an amino group by nitration and subsequent reduction, the substitution of a halogen atom by an amino, alkylamino or hydroxyl group, hydrolysis with an acid or alkali, esterification, alkylation, etc.

The crude dye of formula (I) obtained as above can be purified to a high degree by recrystallization, column chromatography, sublimation, and other means.

Examples of preferred dichroic dyes of the invention so obtained are summarized in Table 1.

The dichroic ratios shown in Table 1 are characteristic values which most characterize the utility of the novel dichroic dyes of the invention.

The dichroic ratio is determined as follows:

1.0% by weight of a dye sample was dissolved in liquid crystals E-8 (a product of Merck & Co.), typical biphenyl-type nematic liquid crystals, and the solution was sealed in a glass liquid crystal cell having a gap of 10 microns which had been treated in advance so as to induce homogeneous aligning. The cell was placed in the light path of a spectro-photometer. Straight polarized light parallel to the alignment of the liquid crystals was applied to the cell, and the absorbance ($A_{81}$) was measured. Furthermore, straight polarized light at right angles to the alignment of the liquid crystals was applied, and the absorbance ($A_{195}$) was measured. The dichroic ratio was calculated from the following equation.

$$\text{Dichroic ratio} = \frac{A_\parallel}{A_\perp}$$

TABLE 1

| Sample No. | $X_1$ | $X_2$ | $X_3$ | $X_4$ | $X_5$ | $X_6$ | Y |
|---|---|---|---|---|---|---|---|
| 1 | OH | $NH_2$ | H | H | H | H | O |
| 2 | OH | $NH_2$ | H | $NH_2$ | H | H | O |
| 3 | OH | H | OH | OH | H | H | O |
| 4 | OH | H | H | H | H | H | O |
| 5 | OH | $NH_2$ | H | H | H | H | O |
| 6 | OH | Br | H | H | H | H | O |
| 7 | OH | OH | H | H | H | H | O |
| 8 | OH | $NH_2$ | H | H | H | H | O |
| 9 | OH | $NH_2$ | H | H | H | H | O |

TABLE 1-continued

| | | | | | | | |
|---|---|---|---|---|---|---|---|
| 10 | NH$_2$ | NH$_2$ | H | H | H | H | O |
| 11 | OH | H | H | H | H | H | S |
| 12 | OH | NH$_2$ | H | H | H | H | S |
| 13 | OH | H | H | H | H | H | S |
| 14 | OH | NH$_2$ | OH | NH$_2$ | H | H | O |
| 15 | OH | NH$_2$ | H | H | CH$_3$ | H | O |
| 16 | NH$_2$ | OH | H | H | H | H | O |
| 17 | NHCH$_3$ | H | H | H | H | H | O |
| 18 | OH | H | OH | OH | H | H | O |
| 19 | OH | NH$_2$ | OH | NH$_2$ | H | H | O |
| 20 | OH | H | NHCH$_3$ | NHCH$_3$ | H | H | O |
| 21 | OH | H | OH | H | H | CH$_2$CH(CH$_3$)$_2$ | O |
| 22 | OH | NH$_2$ | H | OH | H | H | O |
| 23 | NH$_2$ | H | OH | H | H | O | |
| 24 | OH | NH$_2$ | H | H | H | —COOC$_4$H$_9$(n) | O |
| 25 | NH$_2$ | NH$_2$ | H | H | H | —COOC$_4$H$_9$(n) | O |
| 26 | OH | Cl | OH | Cl | H | H | O |
| 27 | OH | NH$_2$ | OH | NH$_2$ | H | H | O |

| Sample No. | Z | Color in toluene | Dichroic ratio in liquid crystals E-8 |
|---|---|---|---|
| 1 | —C$_4$H$_9$(n) | Red | 9.5 |
| 2 | —C$_9$H$_{19}$(n) | Violet | 8.2 |
| 3 | —COOC$_5$H$_{11}$(n) | Orange | 9.3 |
| 4 | —C$_5$H$_{11}$(n) | Yellow | 7.2 |
| 5 | —⟨phenyl⟩—C(CH$_3$)$_3$ | Red | 10.1 |
| 6 | —C$_2$H$_4$OC$_4$H$_9$(n) | Orange | 6.8 |
| 7 | —C$_2$H$_4$CHCH$_3$CH$_2$C(CH$_3$)$_3$ | Orange | 8.1 |
| 8 | —C$_5$H$_{11}$(n) | Red | 9.5 |
| 9 | —C$_{12}$H$_{25}$(n) | Red | 9.3 |
| 10 | —C$_5$H$_{11}$(n) | Reddish violet | 8.1 |
| 11 | —C$_5$H$_{11}$(n) | Yellow | 8.5 |
| 12 | —OCOC$_9$H$_{13}$(n) | Red | 8.7 |
| 13 | —C(CH$_3$)$_3$ | Yellow | 7.8 |
| 14 | —C$_8$H$_{17}$(n) | Blue | 10.5 |
| 15 | —C$_9$H$_{19}$(n) | Red | 10.2 |
| 16 | —C$_7$H$_{15}$(n) | Red | 8.0 |
| 17 | —C$_5$H$_{11}$(n) | Orange | 6.9 |
| 18 | —C$_5$H$_{11}$(n) | Orange | 9.8 |
| 19 | —CH$_2$CH$_2$CH(CH$_3$)CH$_2$C(CH$_3$)$_3$ | Blue | 10.3 |
| 20 | —C$_7$H$_{15}$(n) | Blue | 9.2 |
| 21 | —C$_5$H$_{11}$(n) | Orange | 8.1 |
| 22 | —C(CH$_3$)$_2$CH$_2$C(CH$_3$)$_3$ | Reddish violet | 11.6 |
| 23 | —COOC$_4$H$_9$(n) | Reddish violet | 8.2 |
| 24 | —C$_7$H$_{15}$(n) | Reddish violet | 8.6 |
| 25 | —C$_7$H$_{15}$(n) | Reddish violet | 9.3 |
| 26 | —COO—⟨phenyl⟩—C$_4$H$_9$(n) | Orange | 8.0 |
| 27 | —COO—⟨phenyl⟩—C$_4$H$_9$(n) | Blue | 9.2 |

The dichroic dyes of the invention not only have a high dichroic ratio, but also exhibit other desirable properties required of dyes for liquid crystals, for example excellent solubility in liquid crystals and the excellent durability, particularly excellent light fastness, of liquid crystalline composition containing such dyes. Specifically, when a solution of the anthraquinonic dye of the invention in liquid crystals is sealed in a display element, and left to stand under irradiation of solar light for a long period of time, the electric current increases only to a degree corresponding to an increase in power consumption depending upon the liquid crystals used, and no change in color tone is observed. This light fastness is much superior to that of conventional azoic dichroic dyes. For example, dye No. 8 given in Table 1 which is a typical dichroic dye of the invention has higher solubility and light fastness than known dyes A, B and C for liquid crystals as shown in Table 2.

Known dyes for liquid crystals

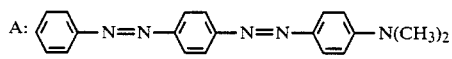

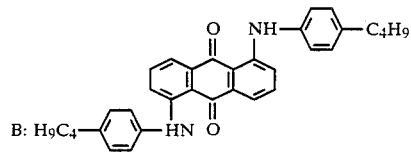

-continued

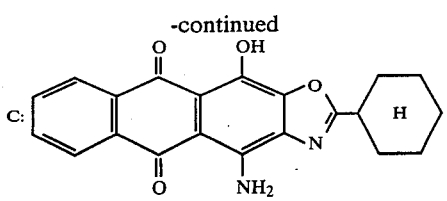

Solubility

This is the solubility (% by weight) of each dye in liquid crystals E-8 (made by Merck & Co.) at 25° C.

Light fastness 0.5% by weight of each dye was dissolved in the liquid crystals E-8, and the solution was sealed into a liquid crystal wall having a gap of 10 microns and including a pair of facing transparent electrodes with an area of 1.0 cm$^2$. The cell was exposed to solar light for 200 hours. Then, a voltage of a rectangular wave form (6V$_{p-p}$, 32 Hz) was applied, and the total current was measured ($\mu$A/cm$^2$).

TABLE 2

| Dye | Solubility (%) | Light fastness ($\mu$A/cm$^2$) |
| --- | --- | --- |
| A (known) | 1.1 | 4.2 |
| B (known) | 0.7 | 3.6 |
| C (known) | 0.4 | — |
| No. 8 (invention) | 4.7 | 2.0 |
| Liquid crystals E-8 alone | — | 1.6 |

Thus, the novel dichroic dyes of this invention markedly remedy the defects of the conventional dichroic dyes for liquid crystals.

The dichroic dyes of the invention, either singly or as a mixture of two or more, can give compositions of various color tones for liquid crystal display elements. In such a composition, the amount of the dye may be such that the dye can dissolve in the liquid crystals. Usually, it is not more than 10% by weight, preferably 0.01 to 5% by weight, based on the liquid crystals. To obtain the desired color, the dichroic dye of the invention may be used in admixture with another dichroic dye or a dye having no dichroic property.

The liquid crystals used in the composition of this invention may, for example, be nematic liquid crystals which show positive or negative dielectric anisotropy, such as biphenyl-type liquid crystal mixtures, phenylcyclohexane-type liquid crystal mixtures, Schiff base-type liquid crystal mixtures, ester-type liquid crystal mixtures and pyrimidine-type liquid crystal mixtures. A mixture of two or more such liquid crystal mixtures may also be used. Liquid crystal mixtures containing at least 80% by weight of the biphenyl-type liquid crystal mixtures, the phenylcyclohexane-type liquid crystal mixtures and/or the ester-type liquid crystal mixtures are especially preferred for use in combination with the dichroic dyes of the invention. Specific examples include E-7 and E-8 (tradenames for products of Merck & Co.) which are the biphenyl-type liquid crystal mixtures, ZLI-1132 and ZLI-1840 (tradenames for products of Merck & Co.) which are the phenylcyclohexane-type liquid crystal mixtures, ZLI-1275 (a tradename for a product of Merck & Co.) which is the ester-type liquid crystal mixtures, and EN-17 (a tradename for a product of Chisso Co., Ltd.).

So-called phase-transition type chiral nematic liquid crystals can also be used which are obtained by adding optically active substances, such as cholesteryl nonanoate or rotatory 4-cyano-4'-isopentyl biphenyl, to these nematic liquid crystals.

The liquid crystal compositions of this invention for color display can be prepared by dissolving the dichroic dye in liquid crystals in accordance with known methods. Usually, the desired liquid crystal composition for color display is prepared by mixing required amounts of the dichroic dye of the invention or a dye composition containing it with the liquid crystal mixtures, stirring the mixture for a long period of time, or stirring it after heating it to above a temperature at which the liquid crystal mixture becomes an isotropic liquid, thereby to dissolve the dye in the liquid crystal mixture.

As required, other additives may be added to the liquid crystalline composition of the invention during, before or after the mixing of the dichroic dye with the liquid crystals.

The following Examples illustrate the present invention more specifically. It should be understood, however, that the invention is in no way limited by the description of these Examples.

EXAMPLE 1

10.2 Parts by weight of 1,2-dihydroxy-3-aminoanthraquinone and 0.6 part by weight of zinc chloride were dispersed in 30 parts by weight of o-dichlorobenzene at 70° C., and 10.8 parts by weight of trans-4-n-pentyl-cyclohexanecarbonyl chloride was added dropwise. The mixture was stirred at 170° to 180° C. for 5 hours, and cooled. Then, 30 parts of methanol was added. The precipitate was filtered, washed with methanol, and dried to give 13.6 parts by weight of a crude dye.

The crude dye was purified by chromatographing it on a column filled with silica gel powder using toluene as an eluent. A yellow dye having a melting point of 165° to 168° C. was obtained (Dye No. 4 in Table 1).

EXAMPLE 2

12.5 Parts by weight of compound No. 4 in Table 1 was dissolved in 75 parts by weight of 98% sulfuric acid, and 2.4 parts by weight of 94% nitric acid was added dropwise at 0° to 5° C. The mixture was stirred at this temperature for 7 hours, and poured into 400 parts by weight of water. The precipitate was filtered and washed with water. The filtration cake was dissolved in 250 parts by weight of monochlorobenzene, and 70 parts by weight of an aqueous solution containing 10.4 parts by weight of 60% sodium sulfide was added. The mixture was stirred under reflux for 10 hours. The resulting product was neutralized with 65.5 parts by weight of 23.6% sodium hydrogen sulfite and 6.3 parts by weight of 50% sulfuric acid, and then steam distilled. Monochlorobenzene was thus distilled out, and the precipitate was filtered, washed with water and dried to give 11.2 parts by weight of a crude dye.

The crude dye was purified by the same column chromatographic technique as in Example 1 to give a red dye having a melting point of 215° to 216° C. (Dye No. 8 in Table 1).

EXAMPLE 3

6.0 Parts by weight of 1,2,5,8-tetrahydroxy-3-aminoanthraquinone and 0.5 part of zinc chloride were dispersed in 25 parts by weight of o-dichlorobenzene, and 6.8 parts by weight of trans-4-n-pentylcyclohxanecarbonyl chloride was added dropwise at 80° C. over the course of 30 minutes. The mixture was stirred at 170° C. for 4 hours. By steam distillation, o-dichlorobenze was distilled out. The residue was filtered, washed with water and dried to give 7.2 parts by weight of a crude dye.

The crude dye was purified by the same column chromatographic technique as in Example 1 to give an orange dye having a melting point of 217.3° to 218.6° C. (Dye No. 18 in Table 1).

EXAMPLE 4

0.1 Part by weight of the dye No. 8 in Table 1 was dissolved in 10 parts by weight of a liquid crystal mixture composed of 43% of 4-n-pentyl-4'-cyano-biphenyl, 17% of 4-n-propoxy-4'-cyanobiphenyl, 13% of 4-n-pentoxy-4'-cyanobiphenyl, 17% of 4-n-octoxy-4'-cyanobiphenyl and 10% of 4-n-pentyl-4'-cyanoterphenyl. The resulting color liquid crystal mixture was sealed into a glass cell having a gap of 10 microns which had been subjected to homogeneous aligning treatment. The maximum absorption wavelength was 512 nm and the dichroic ratio was 10.2. A display device obtained by sealing this color liquid crystal mixture into a glass liquid crystal display element of the same structure as above including transparent electrodes assumed a red color entirely in the absence of a voltage applied, and when a voltage was applied, only the part of the electrodes became nearly colorless, thus showing a good contrast.

EXAMPLE 5

6.0 Parts by weight of 3-amino-1,2,5-trihydroxyanthraquinone and 0.5 part by weight of zinc chloride were dispersed in 55 parts by weight of o-dichlorobenzene, and 8.3 parts by weight of trans-4-(3',5',5'-trimethylhexyl)-cyclohexanecarbonyl chloride was added dropwise at 80° C. over the course of 30 minutes. The mixture was stirred at 175° C. for 7 hours, and cooled. Methanol (150 parts by weight) was added, and the precipitate was collected by filtration, washed with methanol and water, and dried to give 9.1 parts by weight of an oxazole compound. The product was dissolved in 100 parts by weight of nitrobenzene, and 45 parts by weight of sulfuryl chloride was added. The mixture was stirred at 70° to 85° C. for 5 hours. An aqueous solution of sodium carbonate was added to adjust the mixture to pH 7. By steam distillation, nitrobenzene was evaporated, and the precipitate was collected by filtration, washed with water and dried to give 10 parts by weight of a dichloro compound. The product was stirred at 120° to 130° C. for 4 hours together with 120 parts by weight of nitrobenzene, 8.4 parts by weight of potassium carbonate, 0.8 part by weight of copper acetate, 0.8 part by weight of copper powder and 15.3 parts of p-toluenesulfonamide, and then cooled. The mixture was neutralized to pH 7 with 50% sulfuric acid. By steam distillation, nitrobenzene was evaporated, and the precipitate was collected by filtration and dried. The resulting compound was added to 200 parts by weight of 95% sulfuric acid, and the mixture was stirred at 40° C. for 3 hours. It was then poured into 2,000 parts by weight of ice water. The precipitate was collected by filtration, washed with water and dried to give 9.8 parts by weight of a crude dye.

The crude dye was purified by the same column chromatographic technique as in Example 1 to give a blue dye having a melting point of 155° to 157° C. (Dye No.19 in Table 1). The dichroic ratio of the dye was measured in the liquid crystals E-8 in the same way as described above with regard to Table 1, and found to be 10.3 ($\lambda_{max}$ 616 nm). The dye had a solubility in E-8 of 7.2% by weight. When liquid crystals ZLI-1840 were used instead of the liquid crystals E-8, the dichroic ratio of the dye was 10.8 ($\lambda_{max}$ 612 nm). When liquid crystals ZLI-1275 were used, the dichroic ratio was 10.1 ($\lambda_{max}$ 616 nm).

EXAMPLE 6

A crude compound was prepared in the same way as in Example 1 except that 18.8 parts by weight of 1,2,8-trihydroxy-3-aminoanthraquinone and 20 parts by weight of 4-methoxycarbonylcyclohexanecarbonyl chloride were used instead of 1,2-dihydroxy-3-aminoanthraquinone and trans-4-n-pentyl-cyclohexanecarbonyl chloride.

Six parts by weight of the crude compound was dissolved in 75 parts by weight of 98% sulfuric acid together with 2 parts by weight of boric acid, and 2 parts by weight of 94% nitric acid was added dropwise at 0° to 5° C. The mixture was stirred at this temperature for 4 hours. The reaction mixture was poured into 400 parts by weight of ice water, and the precipitate was filtered and washed with water. The filtration cake was dispersed in 250 parts by weight of a 50% aqueous solution of ethanol, and 70 parts by weight of an aqueous solution containing 5 parts by weight of 60% sodium sulfide was added. The mixture was stirred under reflux for 8 hours. Then, it was neutralized by adding 21 parts by weight of 38% sodium hydrogen sulfite and 4 parts by weight of conc. hydrochloric acid. Ethanol was distilled off, and the precipitate was filtered, washed with water and dried. The dried product was stirred under reflux for 3 hours together with 50 parts by weight of n-butanol, 50 parts by weight of toluene and 1 part by weight of p-toluenesulfonic acid, and the mixture was then concentrated until its total amount reached 50 parts by weight. After cooling, the precipitate was filtered, washed with methanol and water, and dried to give 3.2 parts by weight of a crude dye.

The crude dye was purified by the same column chromatographic technique as in Example 1 to give a reddish violet dye having a melting point of 183° to 185° C. (Dye No. 23 in Table 1). It had a dichroic ratio in the liquid crystals E-8 of 8.2.

EXAMPLE 7

A crude compound was prepared in the same way as in Example 1 except that 18.5 parts by weight of 1,2,8-trihydroxy-3-aminoanthraquinone and 26 parts by weight of trans-4-(1',1',3',3'-tetramethylbutyl)cyclo-hexanecarbonyl chloride were used instead of 1,2-dihydroxy-3-aminoanthraquinone and trans-4-n-pentyl-cyclohexanecarbonyl chloride.

34 Parts by weight of the crude compound was dissolved in 375 parts by weight of 98% sulfuric acid containing 10.9 parts by weight of boric acid, and 11 parts by weight of 94% nitric acid was added dropwise at 0° to 5° C. The mixture was stirred at this temperature for 4 hours. The reaction mixture was poured into 2400 parts by weight of water, and the precipitate was filtered and washed with water. The filtration cake was dissolved in 1,500 parts by weight of monochlorobenzene, and 470 parts by weight of an aqueous solution containing 30 parts by weight of 60% sodium sulfide was added. The mixture was stirred under reflux for 4 hours, and then neutralized with 54 parts by weight of 38% sodium hydrogen sulfite and 50% sulfuric acid. By steam distillation, monochlorobenzene was distilled off, and the precipitate was filtered, washed with water and dried to give 31 parts by weight of a crude dye.

The crude dye was purified by the same column chromatographic technique as in Example 1 to give a reddish violet dye having a melting point of 240° to 243° C. (Dye No. 22 in Table 1). The dye had a dichroic ratio of 12.3 in liquid crystals ZLI-1840. It had a dichroic ratio of 11.6 and a solubility of 4.0% in liquid crystals E-8.

We claim:

1. A dichroic anthraquinonic dye represented by the following structural formula

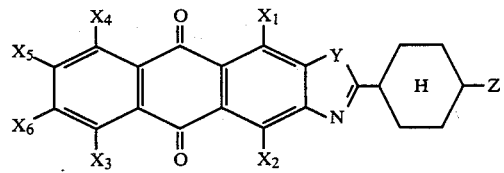

where $X_1$ represents a hydroxyl group, an amino group or a methylamino group; each of $X_2$, $X_3$ and $X_4$ represents a hydrogen atom, a halogen atom, a hydroxyl group, an amino group or a methylamino group; each of $X_5$ and $X_6$ represents a hydrogen atom, a straight or branched alkyl group having 1 to 4 carbon atoms or —COOR$_1$ in which R$_1$ represents an alkyl group having 1 to 4 carbon atoms; Y represents an oxygen or sulfur atom; and Z represents an alkyl group having 4 to 10 carbon atoms, —COOR$_2$ in which R$_2$ represents a straight or branched alky group having 4 to 10 carbon atoms, —OOCR$_2$ in which R$_2$ has the same meaning described above, —C$_2$H$_4$OR$_1$ in which R$_1$ has the same meaning described above, or

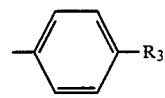

in which R$_3$ represents an alkyl group having 1 to 4 carbon atoms.

2. A liquid crystalline composition for color display comprising liquid crystals and dissolved therein a dichroic dye, said dichroic dye being at least one dichroic anthraquinonic dye represented by the structural formula

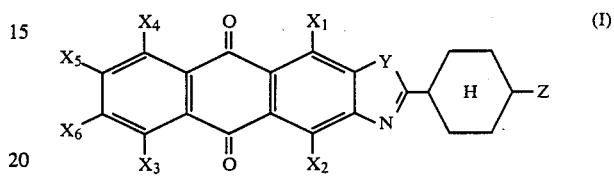

wherein $X_1$ represents a hydroxyl group, an amino group or a methylamino group; each of $X_2$, $X_3$ and $X_4$ represents a hydrogen atom, a halogen atom, a hydroxyl group, an amino group or a methylamino group; each of $X_5$ and $X_6$ represents a hydrogen atom, a straight or branched alkyl group having 1 to 4 carbon atoms or —COOR$_1$ in which R$_1$ represents an alkyl group having 1 to 4 carbon atoms; Y represents an oxygen or sulfur atom; and Z represents an alkyl group having 4 to 10 carbon atoms, —COOR$_2$ in which R$_2$ represents a straight or branched alkyl group having 4 to 10 carbon atoms, —OOCR$_2$ in which R$_2$ has the same meaning described above, —C$_2$H$_4$OR$_1$ in which R$_1$ has the same meaning described above, or

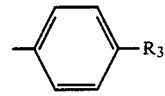

in which R$_3$ represents an alkyl group having 1 to 4 carbon atoms.

* * * * *